(12) United States Patent  (10) Patent No.: US 7,104,174 B1
Ocsai                      (45) Date of Patent:  Sep. 12, 2006

(54) LOG SAWING APPARATUS AND METHOD

(75) Inventor: Bela Tibor Ocsai, Dayton, TN (US)

(73) Assignee: Lumberchief, Chattanooga, TN (US)

( * ) Notice: Subject to any disclaimer, the term of this patent is extended or adjusted under 35 U.S.C. 154(b) by 128 days.

(21) Appl. No.: 10/227,724

(22) Filed: Aug. 26, 2002

Related U.S. Application Data

(60) Provisional application No. 60/316,420, filed on Aug. 31, 2001.

(51) Int. Cl.
  B23D 55/08   (2006.01)
  B26D 1/46    (2006.01)
  B26D 1/56    (2006.01)
  B27B 15/00   (2006.01)

(52) U.S. Cl. ............................ 83/321; 83/284; 83/425; 83/485; 83/578; 83/794; 83/797; 83/801; 83/803; 83/808; 144/376

(58) Field of Classification Search ............... 83/34, 83/35, 36, 578, 753, 758, 794, 486, 508.3, 83/486.1, 318, 487, 565, 789, 795, 796, 797, 83/798, 801, 803, 808, 284, 321, 425, 435.11, 83/485; 144/4.3, 48.4, 376, 378, 379, 144.1, 144/144.51, 144.52
See application file for complete search history.

(56) References Cited

U.S. PATENT DOCUMENTS

| 717,738 | A |   | 1/1903 | Dittbenner | 83/154 |
| 1,765,733 | A | * | 6/1930 | Olsen | 83/471.3 |
| 2,843,917 | A | * | 7/1958 | Crane et al. | 83/797 |
| 2,973,020 | A | * | 2/1961 | Bennett | 83/471.3 |
| 3,122,183 | A | * | 2/1964 | Striebig | 83/477 |
| 3,254,684 | A | * | 6/1966 | Hawkins | 83/789 |
| 3,283,790 | A | * | 11/1966 | Striebig | 83/471.3 |
| 3,587,378 | A | * | 6/1971 | Oppenheim et al. | 83/801 |
| 3,768,347 | A | * | 10/1973 | Wade et al. | 83/471.2 |
| 3,866,496 | A | * | 2/1975 | Payne et al. | 83/471.3 |
| 4,355,557 | A | * | 10/1982 | Mecsey | 83/565 |
| 4,452,117 | A | * | 6/1984 | Brickner et al. | 83/468 |
| 4,454,794 | A | * | 6/1984 | Thornton | 83/471.3 |
| 4,555,969 | A | * | 12/1985 | Abt | 83/486.1 X |
| 4,576,076 | A | * | 3/1986 | Pyle | 83/486.1 X |
| 5,213,022 | A |   | 5/1993 | Elgan | 83/797 |
| 5,394,781 | A | * | 3/1995 | Tsubai | 83/486.1 X |
| 5,806,401 | A |   | 9/1998 | Rajala et al. | 83/865 |
| 5,884,545 | A |   | 3/1999 | Hamby, Jr. | 83/165 |
| 6,105,477 | A |   | 8/2000 | Olson | 83/167 |
| 6,212,983 | B1 | * | 4/2001 | Pyle | 83/34 |
| 6,240,821 | B1 |   | 6/2001 | Landers et al. | 83/364 |

* cited by examiner

*Primary Examiner*—Clark F. Dexter
(74) *Attorney, Agent, or Firm*—Stephen J. Stark; Alan Ruderman; Miller & Martin PLLC

(57) ABSTRACT

A saw mill has a head having at least one saw. The head is configured to travel on a track longitudinally to make alternating cuts between laterally spaced apart first and second work pieces. After traveling forward longitudinally to make a first cut of the first work piece at least one of the heads in the saw move laterally to then cut the second work piece on the return longitudinal trip.

15 Claims, 5 Drawing Sheets

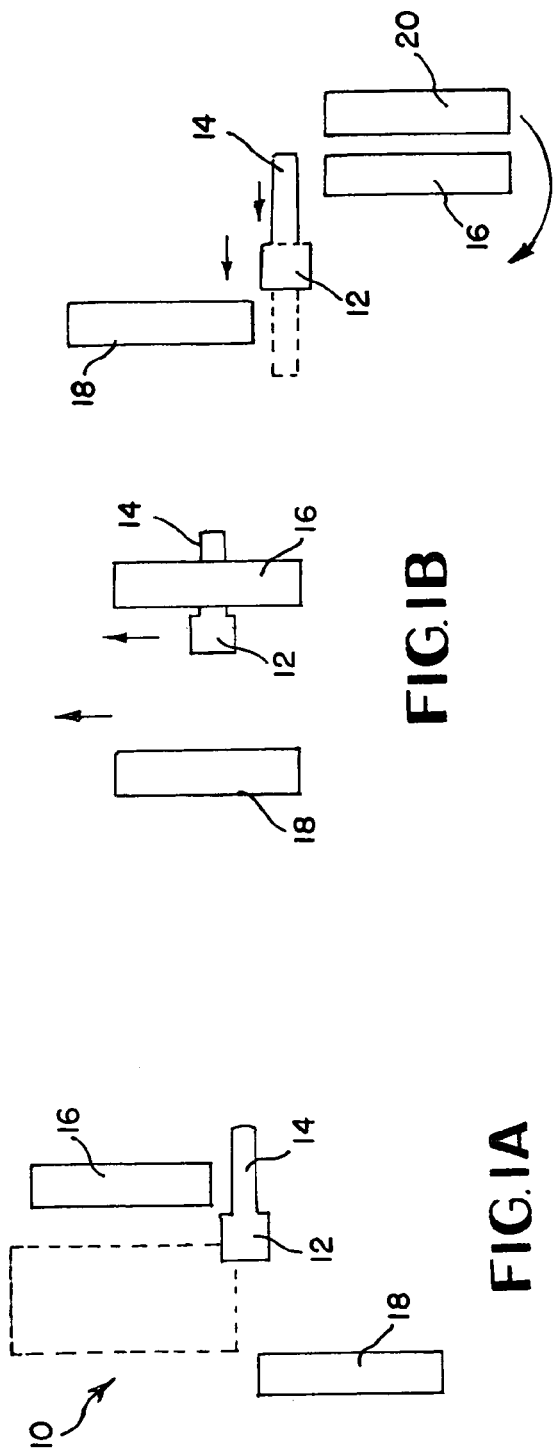

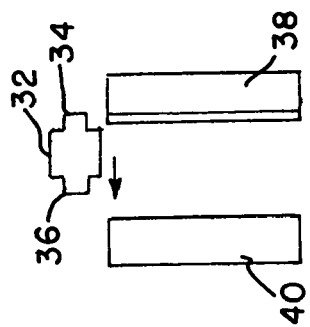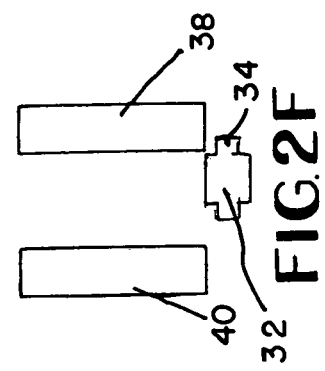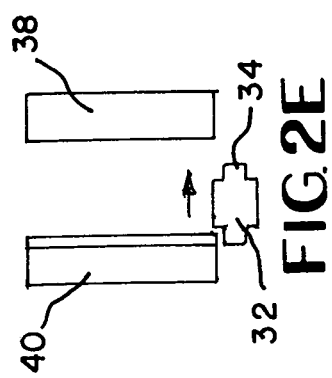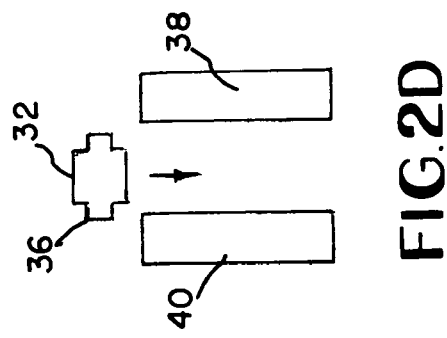

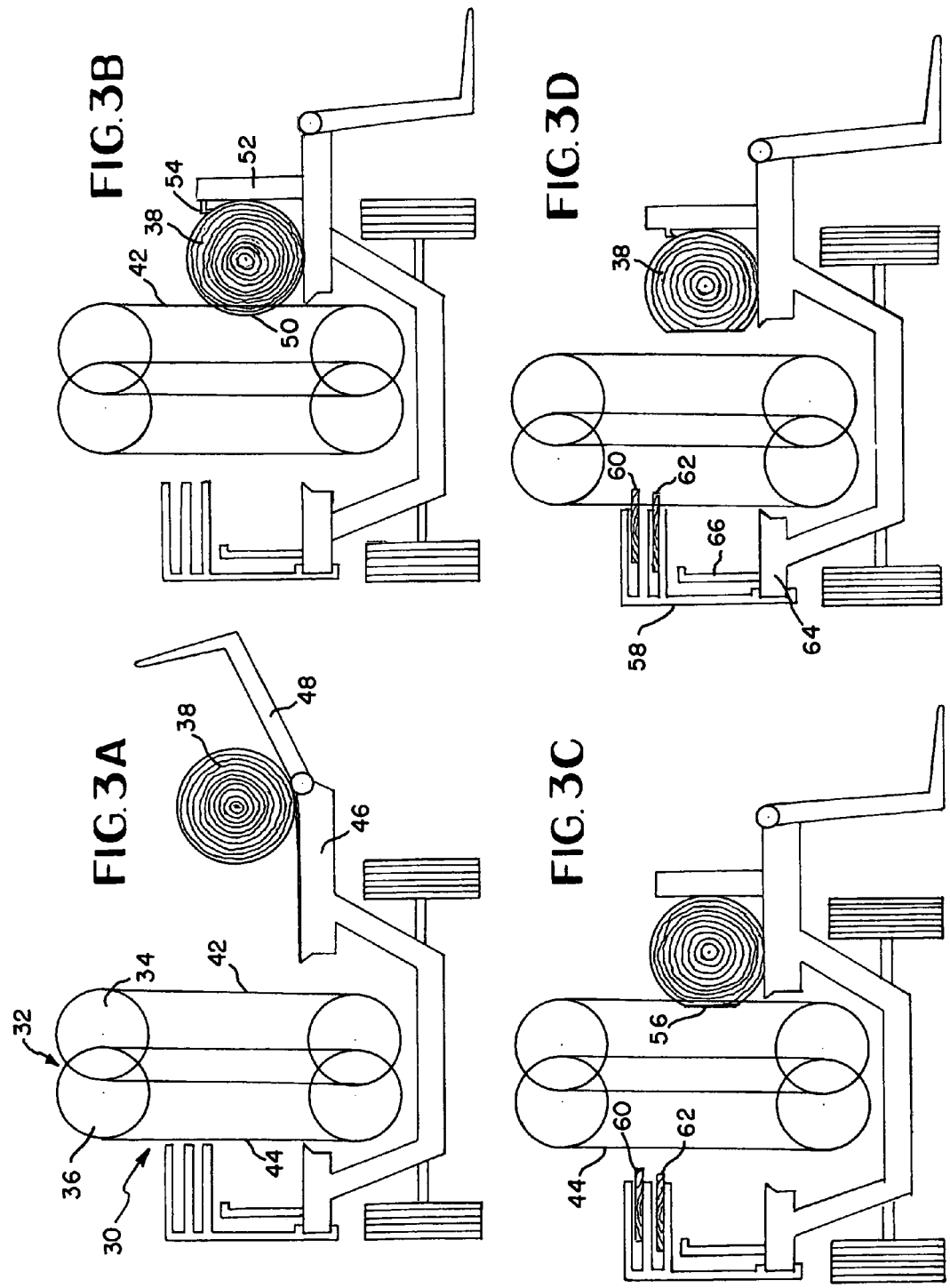

LOG SAWING APPARATUS AND METHOD

PRIORITY CLAIM

This application claims the benefit of U.S. Provisional Patent Application No. 60/316,420 filed Aug. 31, 2001.

BACKGROUND OF THE INVENTION

1. Field of the Invention

The present invention relates generally to an apparatus for sawing logs into lumber. More particularly, the present invention relates to an apparatus for increasing the efficiency of a sawmill, particularly a portable or stationary saw mill by allowing the saw mill to process two work pieces during a single cycle.

2. Description of the Related Art

Converting logs into lumber is an operation typically performed by a saw mill. However, a saw mill is productive only when it is cutting wood. The known portable saw mills (circular blade and band saw blade) cut one log at a time, resulting in unavoidable and unproductive downtime while the log is being turned. This occurs multiple times for each log that is cut.

Most of the current band saw blade mills have narrow blades (<2 inches) with teeth on one side, limiting the cut to one direction, producing one board per cycle. This results in additional unproductive time while the head returns back to the original position, completing the cycle. A few of the current band saw mills have a wide blade (≈6 inches) that has teeth on both sides of the blade, allowing it to cut the same log in both directions producing two boards per cycle. This design dates back to the early 1900's as evidenced by U.S. Pat. No. 717,738. This improves its efficiency; however, due to its design, it is known that it cannot cut while the log is being turned and adjusted for the next cut.

The portable band saw mills that use a narrow blade cut on board per cycle while the wide double-cut blade cuts two boards per cycle.

A need still exists for a more efficient saw mill design.

DISCLOSURE OF THE INVENTION

An object of the present invention is to provide a saw mill having a head with at least one saw blade mounted thereon wherein the head is driven longitudinally about a track while alternatively cutting between two laterally spaced apart work pieces in a single cycle.

Another object of the present invention is to provide a saw mill which reciprocates a head longitudinally to first make a cut of a first work piece, then laterally to position the head to cut a second work piece and then reciprocate in an opposite direction longitudinally to cut a second work piece and then reciprocate back longitudinally to complete a cycle.

Another object of the present invention is to provide a saw mill which provides a head having at least one blade which travels about a track to cut a first work piece and then a second work piece while returning to make another cut on the first work piece.

Another object of the present invention is to provide a log sawing apparatus having two narrow blades that is able to cut one log in one direction while cutting/or edging one or more boards on one side, and re-saw two boards per cycle.

In accordance with the present invention there is provided an improved log sawing apparatus having a unique head consisting of at least one, and preferably two, saws mounted in a tandem fashion with the cutting edge of the blades appropriately oriented to allow the head to cut two logs alternately. The first log is cut when the head moves in one direction and the second log is cut when the head moves in the return direction. While one log is being cut, the other log may be turned. This allows the saw to cut almost continuously, increasing efficiency. A built-in edger utilizes one of the band saw blades in the preferred embodiment. The re-saw attachment(s), if utilized, also utilize the existing band saw blade(s).

BRIEF DESCRIPTION OF THE DRAWINGS

The particular features and advantages of the invention as well as other objects will become apparent from the following description taken in connection with the accompanying drawings in which:

FIGS. 1A–1E are diagrammic representations of a horizontally cutting saw mill of an alternatively preferred embodiment of the present invention;

FIGS. 2A–2F are diagrammic representations of a vertically cutting saw mill of the presently preferred embodiment of the present invention;

FIGS. 3A–3E are cross sectional schematic drawings of the preferred embodiment of the present invention;

DETAILED DESCRIPTION OF THE DRAWINGS

Figure 3E:
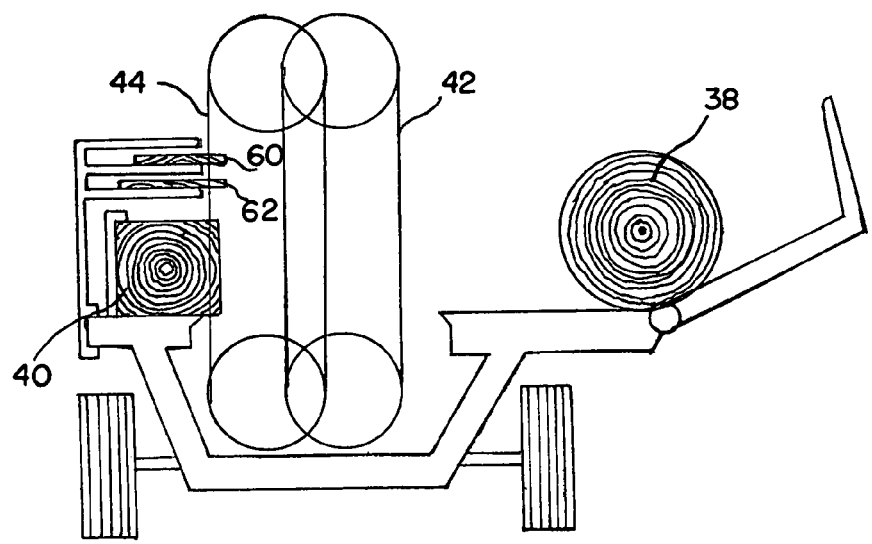

Referring to the drawings labeled 1A–1E, the alternatively preferred embodiment of a horizontally cutting saw mill 10 is shown in a diagrammic representation. The mill 10 is illustrated comprising a head 12 having a single blade 14 mounted thereon. In FIG. 1A, the head 12 is about to start cutting a stationary first work piece 16 with blades of saw 14. The head 12 then moves forwardly, linearly and longitudinally along the length of the work piece 16 as shown in FIG. 1B. Meanwhile, second work piece 18 is illustrated moving at least twice the speed of head 12 so it can be positioned as shown in FIG. 1C which will be described in further detail below. In FIG. 1B, the blade is slicing horizontally through the first work piece 16. A portion of the blade is obscured by the first work piece 16 as illustrated. Of course, the saw 14 could be angled in this embodiment relative to horizontal to assist in separating cut planks or for other purposes.

In FIG. 1C, the saw 14 has completely passed through a portion of the first work piece such that a plank 20 has been created (i.e., the saw has moved from a first position shown in FIG. 1A longitudinally to a second position shown in FIG. 1C extending beyond the length of the first workpiece 16). If the saw 14 is somewhat angled relative to the horizontal, the first plank 20 may slide off of the first work piece 16 as shown.

In FIG. 1C, the process started in FIG. 1A is now approximately halfway through the cycle. The head and the saw 12,14 have completed a first cut along the first work piece 16 and the second work piece 18 has passed the head 12 and the second position and is now in position for cutting.

At this point at least one of the head 12 and saw 14 moves forward laterally relative to the second work piece 18. Although a single saw 14 is illustrated in this embodiment, the head 12 could be equipped with more than one saw such that moving the head 12 towards the second work piece 18 positions a second saw in an appropriate cutting position relative to the second work piece 18. However, as shown in FIG. 1D, the saw has been moved laterally relative to the head so that it is now cutting as shown in FIG. 1D.

The second work piece 18 is then moved at least twice the speed of the head 12 so that as the second work piece 18 and the head 12 are moved through the position shown in FIG. 1D to that shown in 1E the second work piece 18 is cut to provide second plank 22 as shown. The head 12 has returned to the first position in FIG. 1E. The cycle is completed when the head 12 returns to the position shown in FIG. 1A and the saw 14 returns laterally to the position shown in FIG. 1A. As stated above, there is only one head 12 and one saw 14 in this model. In other embodiments there may be more than one saw. Some embodiments may have a double edged saw blade which is used to alternatively cut between spaced apart work pieces alternately.

The saw 14 may take one of a variety of forms whether it be a chain saw, a band saw, a circular saw or other appropriate sawing apparatus with a blade or other cutting apparatus. The saw 14 may move laterally relative to the second work piece by having the head 12 travel along a track, having the head move laterally relative to the second work piece 18, and/or having the saw 14 move relative to one of the second work piece 18 or the head 12. While the saw 14 is cutting one of the two work pieces 16,18, the other of the two work pieces 16,18 may be turned or indexed as desired in preparation for the next cut.

As can be seen from the above diagram, the saw 14 first makes a cut on the first work piece 16 then makes a second cut on the second work piece 18 and then returns to make a third cut on the first work piece as the saw 14 alternates cutting between the first work piece 16 and the second work piece 18. The head 12 continuously travels through a cycle during this process. The process of alternating between a first work piece and a second work piece 16,18 is believed to be new. Of course, in some embodiments a single work piece 16 or 18 may be cut with a head piece which rotates pivots and/or inverts after each pass to appropriately place/locate a saw blade for the next cut as long as a portion of the saw moves laterally after the ends of the work pieces.

Additionally, although the preferred embodiment of operation shown in FIGS. 2A–2F shown as separate and distinct from the alternative embodiment of FIGS. 1A–E, the two could be combined such that horizontal and vertical cuts are performed by a single saw mill. Also, the preferred embodiment has two saws while the alternative embodiment of FIGS. 1A–1E has a single saw. Other embodiments may have three or more saws, especially if vertical and horizontal cuts of logs are to be conducted.

Figure 5:
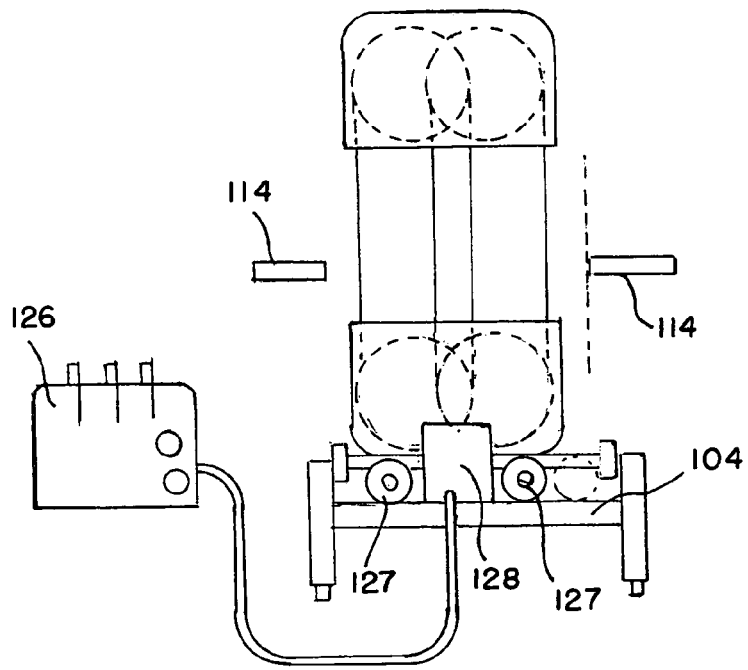
FIG. 5 is a partial front view of the saw mill of FIG. 4.
Figure 4:
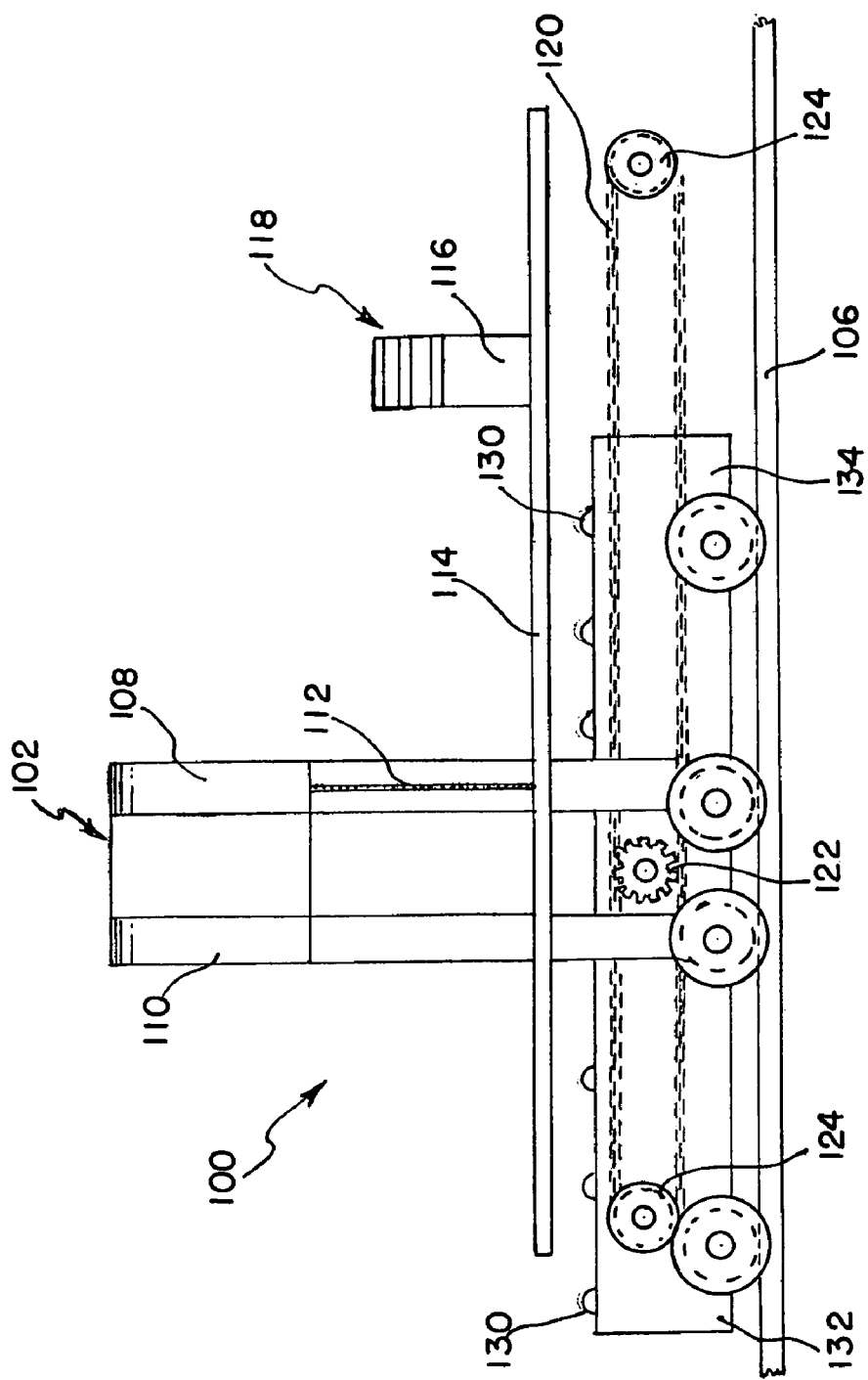
FIG. 4 is a partial side plan view of a saw mill the preferred embodiment of the present invention.

FIGS. 4 and 5 showed a working model of a vertically cutting saw mill 100. The saw mill 100 has a head 102 which is movable laterally within a carriage 104. The carriage 104 is supported by rollers 129 for movement longitudinally on rails 106 as will be explained in further detail below. The head 102 is equipped with two saws 108,110. Blade 112 as illustrated in FIG. 4. A deck 114 is illustrated proximate to the first blade 112. A first extension 116 of an edger 118 is illustrated as well.

The carriage 104 may be driven by chains 120 or otherwise with driver 122. One of the gears 124 operated by controller 126 so that the head 102 is moved longitudinally relative to the decks 114 and the work pieces (not shown). In order to move the head 102 laterally, the rollers 127 may be driven by the controller 126 coupled to motor 128 or otherwise such as the lateral position of the head 102 relative to either of the decks 114 is selected.

Alternatively the track 106 may be oval or otherwise shaped to accomplish lateral and longitudinal movement of the head. It is to be understood that throughout this document that longitudinal is the direction the head moves during the cutting process, lateral is perpendicular to longitudinal and away from a workpiece. Horizontal cutting occurs substantially in the plane of longitudinal and lateral (unless canting is occurring as described above) while vertical cutting occurs substantially perpendicularly to the plane of lateral and longitudinal. Of course, canting may occur in vertical cutting as well.

Rollers 30 are utilized to receive cut planks once cut. Once the planks drop on the rollers 130 they may be handled by operators at either end of the saw mill 100. Accordingly, when the head 102 completes the length of travel to a work piece, the cut plank falls onto the rollers 130 supported by trucks 132,134.

The preferred embodiment of the present invention utilizes thin kerf band saw blades so as to be ecologically friendlier than the circular mills, due, in part, to the thinner blade. This feature has been found to result in approximately 40% more of the tree being cut into lumber instead of being lost to sawdust. However, the circular blades' advantage over the current band saw mills is that they are able to cut faster. By taking advantage of the alternating cutting of the present invention, thin kerf band saw blades now have the ability to match and/or exceed the productivity of the portable circular saws, at the same time utilizing our limited resources more efficiently. However, it will be appreciated that a circular saw mill could likewise be constructed in accordance with the present invention so as to reap additional increases in both speed and efficiency.

FIGS. 2A–3 show the diagrammic representation of the preferred embodiment of the present invention. A saw mill 30 is shown having a head 32 with first and second saws 34,36.

In FIG. 2A, the first saw 34 is about to cut the first work piece 38. The head 32 along with the saw 34 is moved longitudinally towards the first work piece 38 from a first position and the saw blade makes a cut as shown in FIGS. 2B–2C. In FIG. 2B the saw 34 is about half way through the first work piece 38. In FIG. 2C the first work piece 38 has been cut through by the first saw 34 as the head 32 passes a second position. The first work piece is located intermediate the first and second positions.

From FIGS. 2A to 2C, 32 the first saw 34 has moved longitudinally along the length of the first work piece 38 to make the cut. After passing the end of the first work piece 38 the head 32 is then moved laterally to the position shown in FIG. 2D. This lateral movement may be performed in a plurality of ways whether or not an oval shaped track is utilized or whether the head 32 rides in a carriage as has been described above as shown in FIGS. 4 and 5.

With the head positioned relative to the second work piece 40 as shown in FIG. 2D, the head 32 and second saw 36 cut longitudinally so that the second saw 36 makes the cut through the second work piece 40 as shown in FIG. 2E. After completing the longitudinal travel across the length of the second work piece 40, the head moves laterally back to the starting position in preparation to make another cut on the first work piece 38.

As can be seen from FIGS. 2A–2F, the two saws 34,36 move longitudinally in a forward direction while saw 34 cuts the first work piece 38. Both work pieces 38,40 remain stationary during this process. Of course, the second work piece 40 may be indexed, rotated, replaced, or otherwise adjusted while the first work piece 38 is being cut. Similarly, while the second work piece 40 is being cut by the second saw 36, the work piece 38 may be turned, indexed, replaced, or otherwise adjusted as necessary.

By indexing, it is meant that the log or saw is moved laterally so that it may be aligned for the next cut. Indexing may be performed by moving the work pieces 38,40 or the saw. Indexing for the next cut of the first and second work pieces 38,40 may be performed in at least one of two ways. First, the work pieces 38,40 themselves may be moved inwardly in the preferred embodiment for the first cut and/or the lateral movement of the head 32 may be increased or decreased as appropriate. Accordingly, when beginning cuts of the work pieces 38,40, the lateral movement as shown in FIGS. 2A–2F may be initially smaller than during subsequent cuts of the work pieces 38,40. In some embodiments the lateral movement may be selectively stopped at any point for the next cut.

FIGS. 2A–2F show the movement of the head 32 and the saws 34,36. It is also noteworthy that in some embodiments such as if the head travels about an oval track 3, the first saw 34 may be the only saw utilized since it will continually face the first and second work pieces as it travels about the circular track intermediate the first and second work pieces 38,40. Alternatively, in other embodiments the head 32 may travel about the outer sides of the first and second work pieces 38,40 such that planks cut from the outer sides of the first and second work pieces 38,40.

FIGS. 3A–3E are cross-sectional representations of the preferred embodiment of saw mill 30. The head 32 of saws 34,36 which are illustrated as band saws having cutting blades 42,44. First work pieces 38 is illustrated as being loaded into position with lift 48 in FIG. 3A. In FIG. 3B the first work piece 38 has been moved to begin the cutting process with the first saw 34. The first work piece 38 is illustrated as a log, however, planks, or other appropriate work pieces may be loaded at this point. The work piece 38 sits on log deck 46. First plank 50 is being cut with the first blade 42 in FIG. 3B. An indexer 52 and grip 54 maintains the log or first work piece 38 in the desired position. The indexer 52 is moveable relative to the log deck 46 so that the desired width of the first plank 50 is cut by the first blade 42. The grip 54 prevents the work piece 38 from rotating during the cutting process. In FIG. 3C, the first work piece 38 has been rotated and another plank 56 is being cut.

Opposite the log 46 is an edger 58 and edger 58 may be utilized to remove bark from the sides of the planks or slabs 60,62. The edger 58 may be utilized to trim the planks 60,62 to the desired width. Below the edger 58 is a cant deck 64 which also has an indexer 66 for holding and retaining the second work piece 40 relative to the second saw 36 so that the second blade 44 makes the desired thickness of cut of the second work piece 40 as shown in FIG. 3E. Once a plank is cut from the second deck 64 or cant deck, it may be placed in the edger 58 as is known in the art. While a log deck 46 and an cant deck 64 are illustrated, other combinations of decks of various varieties and designs may be utilized.

For FIG. 3A, the head 32 is in the position illustrated in FIG. 2D or 2E without a second work piece 40 being loaded. The first work piece 38 is being moved into position. The head 32 then transitions as shown in FIG. 2F to begin work on the first work piece 38 as it cuts longitudinally the length of the first work piece. The first slab 50 is placed in the edger 58 as is known in the art as illustrated in FIGS. 3C so that on the return longitudinal cut shown in FIG. 3D the edges may be cut. While the edges are cut as in FIG. 3D, the first work piece 38 may be indexed, rotated or replaced as is known in the art. After edging the slabs 60,62, they may be removed and/or the edger 58 may be restocked with additional planks and/or the cant deck may provided with a second work piece 40 such as a squared log (cant) for re-sawing or a log as appropriate.

As shown in FIGS. 3A–3E the head 32 has two band saws 34,36 mounted in a tandem fashion thereon with the blades pointing in opposite direction, i.e., in Figure B, blade 42 cuts going into the page while blade 44 cuts coming out of the page (or visa, versa). When the head 32 travels in the forward or reverse longitudinal direction, the appropriate blade 42,44 which points in the direction of the head movement is able to cut. This feature enables the head 32 to alternatively process two work pieces 38,40 at the same time. In other embodiments, a re-saw attachment may be mounted on the head 32 instead of or in addition to the band saws 34,36. Accordingly, while the first blade 42 may be cutting a log as illustrated as first work piece 38 on the forward deck, a board may alternatively be resawed by second blade 44 as the second work piece 40 on the reverse pass. Accordingly, except for brief periods of time when a log is being loaded, a squared log is being loaded or transferred to the cant deck, and/or when the head is moving laterally between cuts, at least one of the blades may be cutting lumber substantially continuously.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

The invention claimed is:

1. A sawmill comprising:
   a track;
   a head having a first and a second saw connected thereto, said first saw having a first blade, said head moveable longitudinally along the track from a first to a second position;
   a first deck for supporting a first work piece;
   a second deck for supporting a second work piece, said second deck spaced laterally from the first deck; and
   wherein as the first saw is initially positioned relative to the first deck to cut intermediate the first and the second position as the head travels in a forward longitudinal path down the track to cut the first work piece with the first blade, and as the head travels in an opposite longitudinal path down the track, the second saw is positioned relative to the second deck prior to the head reaching the first position so that the second saw cuts on a return cutting path, wherein as the head travels in the forward longitudinal path, the first saw travels in a forward cutting path to cut the first work piece, and as the head travels in the opposite longitudinal path, the second saw travels in a return cutting path to cut the second work piece, and the forward cutting path and the return cutting path are substantially parallel to each other.

2. The sawmill of claim 1 wherein the track is located intermediate the first and second deck.

3. A sawmill comprising:
   a track;
   a first stationary deck for supporting a first work piece;

a head having at least one saw connected thereto, each said saw having a blade, said head moveable longitudinally along the track from a first to a second position relative to the first deck;

a second deck for supporting a second work piece, said second deck spaced laterally from the first deck and the second deck moves longitudinally relative to the head and the first deck at least twice the speed of the head; and wherein the blade of the at least one saw is initially positioned to cut relative to the first deck intermediate the first and the second position as the head travels in a forward longitudinal path down the track, and the at least one saw is positioned relative to the second deck as the head travels in an opposite longitudinal path down the track prior to the head reaching the first position, with the blade alternating cutting relative to the first and second decks.

4. The sawmill of claim 3 wherein at least one of the head and the at least one saw moves laterally along the track after reaching the second position prior to the head traveling in the return longitudinal path.

5. The sawmill of claim 4 further comprising a carriage and first rollers intermediate the carriage and the track and second rollers intermediate the head and the carriage wherein the head moves longitudinally on the first rollers, and said head moves laterally on the second rollers.

6. A sawmill comprising:
a track;
a head having at least one saw connected thereto, each said saw having a blade, said head moveable longitudinally along the track from a first to a second position, the at least one saw further comprises a first and a second saw;
a first deck for supporting a first work piece;
a second deck for supporting a second work piece, said second deck spaced laterally from the first deck; and wherein the first saw is initially positioned relative to the first deck to cut intermediate the first and the second position as the head travels in a forward longitudinal path down the track to cut the first work piece, and the second saw is positioned relative to the second deck as the head travels in an opposite longitudinal path down the track prior to the head reaching the first position to cut the second work piece, wherein said first saw cuts on the forward longitudinal path and the second saw cuts on the return longitudinal path thereby alternating cutting relative to the first and second decks.

7. The sawmill of claim 6 wherein the first deck is stationary and the head moves longitudinally relative to the first deck.

8. The sawmill of claim 7 wherein the second deck is stationary and the head moves longitudinally relative to the first and second decks.

9. The sawmill of claim 6 wherein the second deck has an edger connected thereto.

10. The sawmill of claim 6 wherein one of the at least one saw is vertically oriented.

11. The sawmill of claim 6 wherein the first and second decks are parallel to one another.

12. The sawmill of claim 6 wherein at least a portion of the track is linear.

13. The sawmill of claim 6 wherein the track is located intermediate to the first and second decks.

14. The sawmill of claim 6 wherein at least one of the head and the at least one saw moves laterally after reaching the second position and prior to the head traveling in the return longitudinal path.

15. The sawmill of claim 6 wherein the head is restrained from travel off of the track.

* * * * *